United States Patent [19]

Barbier et al.

[11] 4,019,939
[45] Apr. 26, 1977

[54] PROCESS FOR THE MANUFACTURE OF HOSE

[75] Inventors: Jean Barbier, Lyon; Paul Cachon, Caluire, both of France

[73] Assignee: The Goodyear Tire & Rubber Company, Akron, Ohio

[22] Filed: Aug. 28, 1975

[21] Appl. No.: 608,618

[30] Foreign Application Priority Data

Oct. 4, 1974  France .............. 74.34177

[52] U.S. Cl. .......................... 156/80; 156/143; 156/149; 156/155; 156/156; 156/172; 156/287; 264/173; 264/236; 264/247

[51] Int. Cl.² .............. B29C 25/00; B29B 3/00; B32B 1/08

[58] Field of Search ............ 156/80, 143, 144, 149, 156/155, 156, 172, 173, 296, 498, 430, 431, 432, 287, 311; 138/125, 126, 172, 174; 264/166, 173, 174, 103, 236, 347

[56] References Cited

UNITED STATES PATENTS

| 2,201,691 | 5/1940 | Gammeter ............... 156/80 |
| 2,469,849 | 5/1949 | Silver .................... 156/80 |
| 3,113,897 | 12/1963 | Hönningstad et al. ....... 156/155 |
| 3,413,708 | 12/1968 | Norville et al. ............ 156/80 UX |
| 3,425,982 | 2/1969 | Fink ..................... 156/155 X |
| 3,824,141 | 7/1974 | Miller et al. .............. 156/143 |

FOREIGN PATENTS OR APPLICATIONS

| 1,100,359 | 4/1955 | France |
| 1,580,370 | 7/1969 | France |

*Primary Examiner*—William A. Powell
*Assistant Examiner*—Thomas Bokan
*Attorney, Agent, or Firm*—F. W. Brunner; R. P. Yaist

[57] ABSTRACT

The invention concerns a process for the manufacture of textile or wire-reinforced hoses, the components of which are placed while the inner tube is supported by a mandrel.

According to this invention, the mandrel is made of a congealable fluid which is introduced inside the tube and then cooled and solidified during manufacturing steps wherein the formed assembly will resist mechanical stresses which would not be endured by the sole constituents of the hose. The mandrel is thereafter brought back to a liquid form to be drained off.

The invention is applicable to the manufacture of medium and high pressure hoses.

7 Claims, 1 Drawing Figure

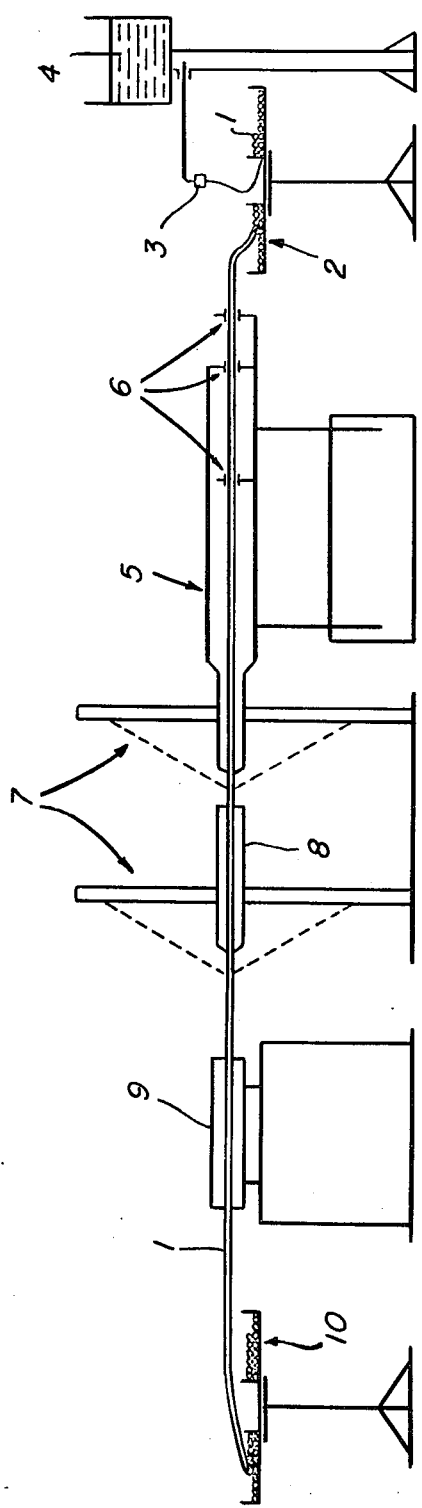

PROCESS FOR THE MANUFACTURE OF HOSE

This invention relates to hoses and particularly to a process and apparatus for the manufacture of hoses.

Heretofore, most of high pressure hoses, reinforced either by textile or metallic structures, have been manufactured on mandrels. These mandrels, made of steel, rubber or plastic materials, support the inner tube of the hose, then the hose itself during reinforcement operation, placing of outer cover, vulcanization etc. Use of a mandrel is especially necessary when the elements constituting the reinforcing structure arranged as braids or spirals are placed under a relatively high tension.

This known procedure of manufacturing hoses on mandrels has, however, a number of following disadvantages:

It is necessary to remove the mandrel, by mechanical or hydraulic means, on completion of the hose manufacture.

The maximum lengths of hose which are possible to manufacture are necessarily limited. In the case of rigid metallic mandrels handling problems due to space required and the weight of the mandrels occur starting with certain lengths; in the case of flexible mandrels, the difficulties arise from the fact that it is impossible to remove very long mandrels from the finished hose.

Moreover, flexible mandrels give rise to problems during their inspection, lubrication, cleaning, splicing and recycling.

Consequently, the cost of manufacturing hoses on flexible and particularly rigid mandrels according to known procedures is substantially high.

The present invention has as its object the provision of a new process for overcoming the foregoing disadvantages. This is accomplished by eliminating the use of the rigid and flexible type mandrel as previously described, even in the manufacture of hoses reinforced with metallic wires placed under elevated tension.

This process consists in forming a mandrel as hereinafter described from congealable fluid which is introduced in liquid form into the hose to be manufactured. This fluid is cooled and solidified during subsequent operations during which the hose must resist mechanical stresses which otherwise would not be endured by its own elements. The solidified liquid is then brought back to liquid form in order to be removed from the hose.

The congealable fluid may be water, water in admixture with suitable solid or liquid additives, or any material which is liquid at ambient temperature or even solid at ambient temperature but which can be easily melted at a temperature slightly higher than the ambient temperature.

Thus the advantages of the process of this invention may be summarized as follows:

Elimination of the problems connected with the removal of the mandrel.

Possibility of manufacturing very long hoses.

Elimination of mandrel maintenance problems.

Simplicity and economy.

Dimensional accuracy superior to that which is obtainable by prior art procedures. This accuracy is achieved by calibrating the hose during cooling and solidification of congealable fluid introduced into the hose. Furthermore, the solidified fluid brought back into liquid form may be retained in the hose at a sufficient pressure during subsequent manufacturing and vulcanization operations before its removal from the hose.

Successive stages of hose manufacture according to this process may be summarized as follows:

1. "Tube" manufacture: the term "tube" is used herein to designate the inner tube of the hose. It may be made by any known process, for instance by extrusion. This tube is filled with a fluid at low pressure, either during its manufacture or thereafter.

2. Congelation: the tube filled with the fluid is brought in contact with an environment kept at very low temperature. The fluid is in this manner transformed rapidly into a solid bar, while the material of the tube itself becomes rigid. At the same time, the diameter of the tube is calibrated to the exact desired dimension and this diameter remains constant until the assembly is defrosted.

3. Placement of reinforcing structure: reinforcing members are laid down, according to known processes, on the tube filled with the frozen fluid which functions as a mandrel.

The hose is kept at low temperature until it reaches the drawing device in order to avoid any temperature rise and any inopportune lengthening which would affect adversely regular placing of the reinforcing structure.

4. Manufacture of outer tube: this operation can be effected, for instance, by extrusion according to well known procedures. It may be necessary, at this stage, to complete the filling of the tube by introducing a fluid under pressure in order to keep hose dimensions constant.

5. Vulcanization: if the hose is made of a vulcanizable elastomer, it needs to be vulcanized. This curing operation is effected by any known process: lead or nylon wrap vulcanization, continuous vulcanization, etc. However, one of the economical processes is to cure the hose on a plate in an autoclave filled with live steam. In this case, the congealed fluid in the hose after being brought back into a liquid form is kept at a pressure higher than the pressure of the autoclave.

6. Inspection and tests: these operations do not differ from common practice. However, conventional removal of the mandrel is simply substituted by the draining of the fluid from the hose.

The process of this invention is carried out in a special apparatus which is an integral part of the invention. This apparatus comprises essentially a congelation chamber which is traversed continuously by a tube being unrolled from a flat pan or from a reel and which is connected through a swivel joint to a discharge device at a constant pressure, such as a pressure tank or a calibrated valve.

According to a preferred embodiment of the invention, this congelation chamber is connected to a tube calibration device formed of several dies located inside and/or outside of the congelation chamber.

The present invention will be more readily understood with reference to the following description and the accompanying drawing which illustrates a non-limiting example, embodiment of the invention.

The FIGURE shows only the equipment which is necessary for the reinforcement operation (placing of the reinforcing structure).

Tube 1, filled with water at a low pressure, is coiled on a first pan 2. One end of this tube is closed, the other end is connected, through a swivel joint 3, to a pressure tank 4 intended for accommodating the excess of water generated by the conversion of water to ice (it is known that ice occupies a volume approximately 10% larger than the corresponding volume of water).

The congelation device comprises essentially a congelation tube 5 which is traversed by the tube 1 uncoiled from the first pan 2 for a distance sufficient to lower suitably the temperature of the product. Any known freezing medium can be used for this purpose, for instance, liquefied carbon dioxide or liquefied nitrogen. However, it is preferred to freeze the tube in a liquid medium, for example in contact with a non-congealed liquid to insure a more efficient transfer of calories from the product.

Moreover, the congelation tube 5 is connected to a tube calibration device 6 adapted to adjust the outside diameter of the tube to the desired size. This device may be constituted, for instance, by several dies of appropriate diameters, some of them being located within the congelation tube, others outside thereof. The diameter of these dies, their length, their number and their location are functions of the characteristics of the hose to be manufactured and of the speed during its passage through the reinforcing device 7.

The reinforcing device 7 located immediately after the congelation tube is a double deck braider. An auxiliary congelation tube 8, connected to the reinforcing device 7 permits the hose to be kept at low temperature up to the caterpillar haul-off 9, thus insuring its regular forward movement.

Upon leaving the caterpillar, the tube 1 with its reinforcing structure is coiled up on a second pan 10.

It is to be noted that conventional means utilized in subsequent hose manufacturing operations (cover extrusion, vulcanization, etc.) are not shown in the drawing.

The process of this invention is applicable to the manufacture of all medium or high pressure hoses, where lay-down tension of reinforcing members requires the use of mandrels for either rubber or plastic hoses.

Among the advantages of this process, already mentioned hereinabove, it will be noted that excellent dimensional accuracy and regularity are achieved by means of the calibration device 6 connected to the congelation tube 5. Tolerances on the reinforcement diameter of the hose are lower than those of the same hose manufactured conventionally on a rigid or flexible mandrel.

It will be understood that the invention is not limited to the sole embodiment which is described above and illustrated as an example. Various changes may be made in regard to specific details of this invention. Thus the congealable fluid described herein may comprise not necessarily pure water, but may also comprise water containing fibers or other solid materials susceptible to reduce brittleness of ice, as well as water containing liquid additives capable of raising or lowering its congealing temperatures, or a wax melting at a temperature slightly higher than the ambient temperature.

We claim:

1. A process for the manufacture of a hose comprising an inner tube and reinforced by a textile or metallic structure surrounding said tube with the constituents of the reinforcing structure being applied to said tube while said tube is supported by a mandrel, the inprovement wherein the hose is manufactured by the successive steps of:
    A. introducing a congealable fluid in liquid form into said tube during or after the manufacture of said tube;
    B. cooling and solidifying said liquid to form a solid mandrel capable of withstanding mechanical stresses during the manufacture of said hose;
    C. applying said reinforcing structure to said tube;
    D. converting the solidified liquid into liquid form and curing said hose into an integral structure; and
    E. removing the liquid thus formed from said tube.

2. The process according to claim 1 wherein the congealable fluid employed is water.

3. The process according to claim 1, wherein the employed congealable fluid is water containing solids which decrease the brittleness of ice.

4. The process according to claim 1, wherein the employed congealable fluid is a wax melting at a temperature higher than the ambient temperature.

5. The process according to claim 1, wherein the tube into which said congealable fluid is introduced is cooled in a liquid medium.

6. The process according to claim 1, wherein said tube is calibrated during cooling and solidification of said congealable fluid introduced therein.

7. The process according to claim 1, wherein said congealable fluid is kept in said hose, after being converted into liquid form, under pressure during subsequent manufacturing operations and vulcanization, then removed from said hose.

* * * * *